UNITED STATES PATENT OFFICE.

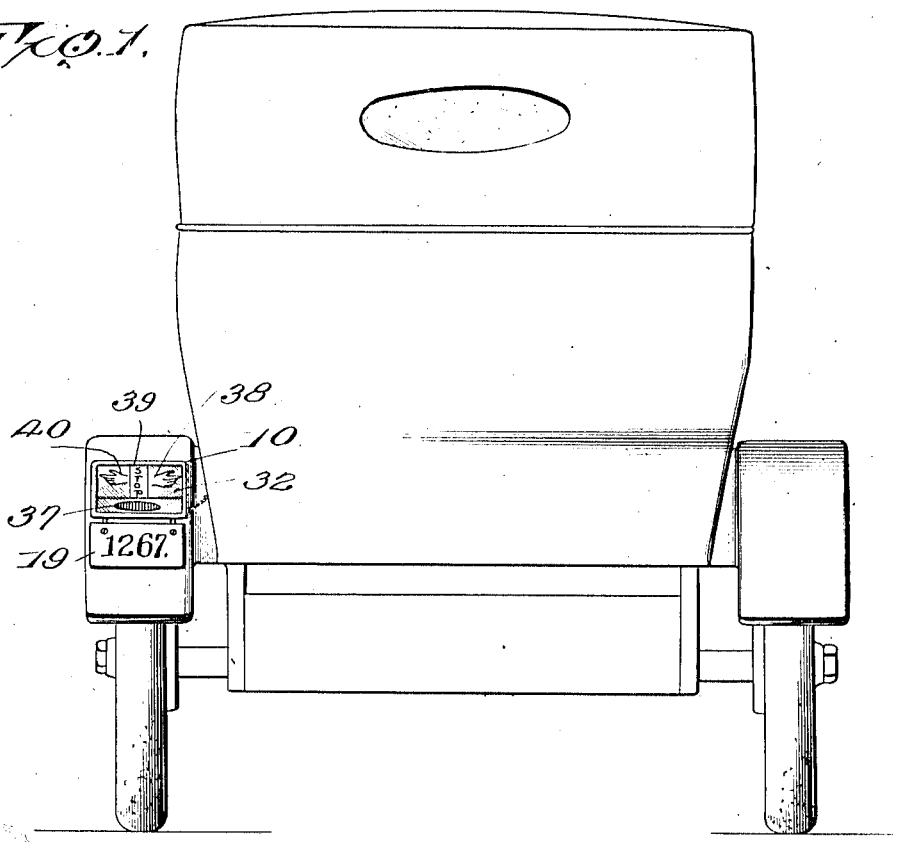
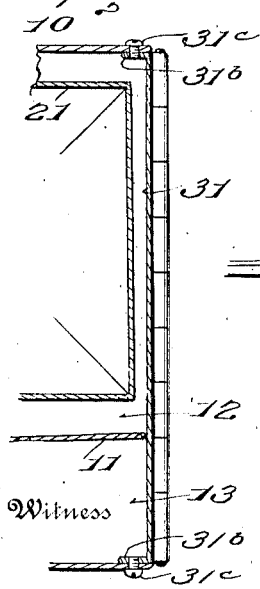
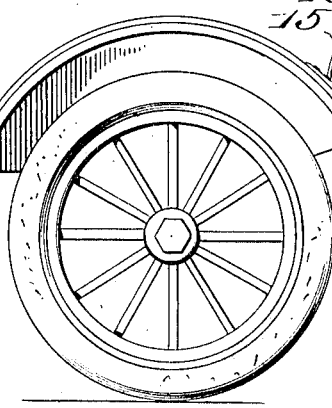
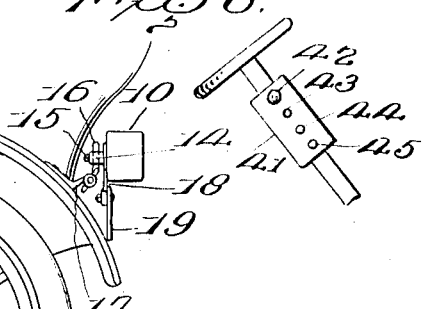

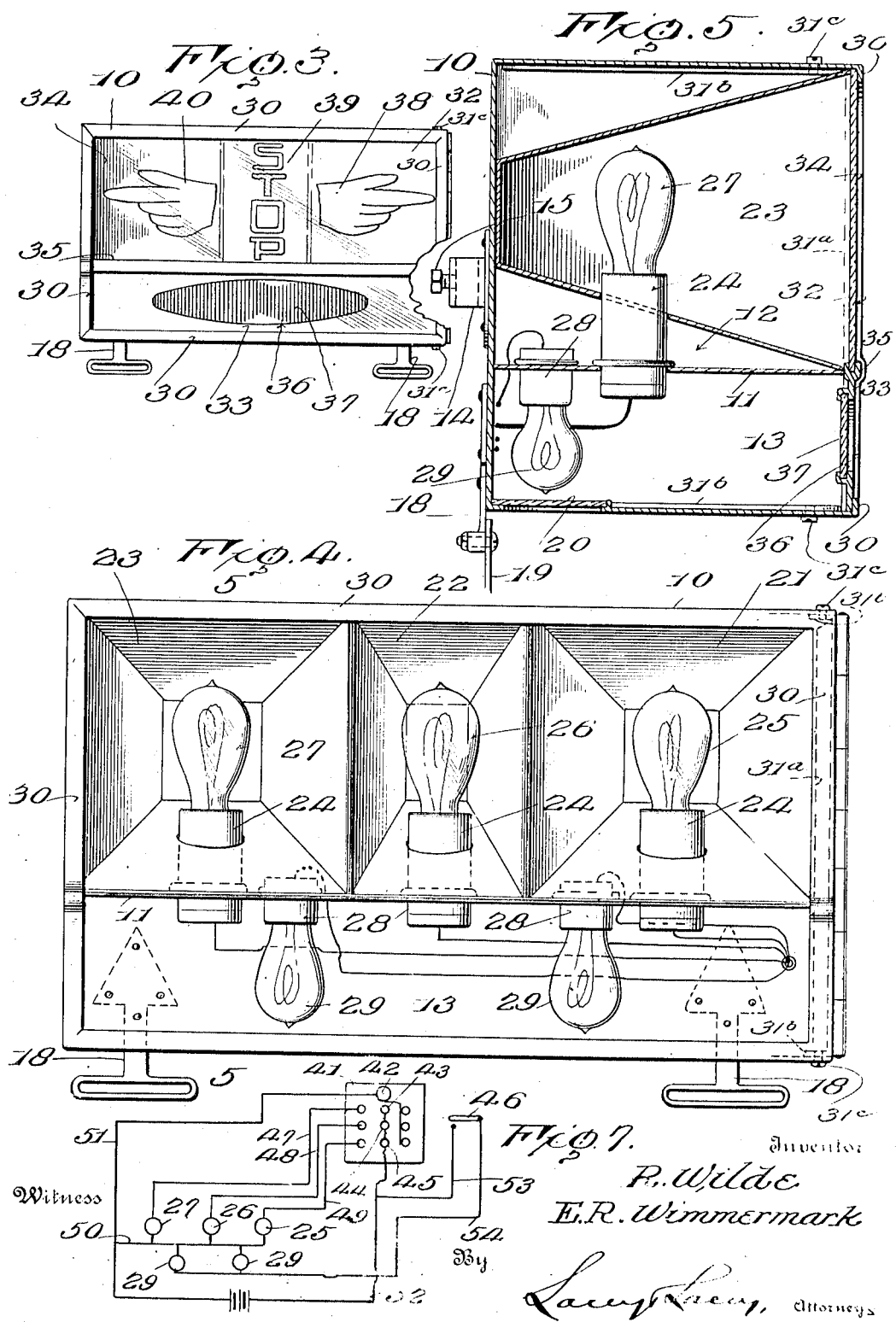

RAY WILDE AND ERNEST R. WIMMERMARK, OF MUSKEGON, MICHIGAN.

AUTOMOBILE DIRECTION-SIGNAL.

1,314,626.            Specification of Letters Patent.            Patented Sept. 2, 1919.

Application filed May 13, 1918. Serial No. 234,321.

*To all whom it may concern:*

Be it known that we, RAY WILDE and ERNEST R. WIMMERMARK, citizens of the United States, residing at Muskegon, in the county of Muskegon and State of Michigan, have invented certain new and useful Improvements in Automobile Direction-Signals, of which the following is a specification.

This invention relates to an improved direction signal for motor vehicles and has as its primary object to provide a device of this character whereby a driver may readily indicate an intention to turn either to the right or left or to stop.

The invention has as a further object to provide a device of this character which will be electrically controlled and which may be operated from the steering post of the vehicle.

A further object of the invention is to provide a signal which will also be adapted to carry the license tag of the vehicle and wherein the said tag may be illuminated from the signal casing.

And the invention has as a still further object to provide a signal which will be particularly simple in construction and which may be readily mounted upon and used in connection with substantially any conventional type of motor vehicle.

Other and incidental objects will appear as the description proceeds. In the drawings wherein I have illustrated the preferred embodiment of the invention, and wherein similar reference characters designate corresponding parts throughout the several views:

Figure 1 is a rear elevation of a conventional type of motor vehicle equipped with our improved signal, Fig. 2 is a fragmentary side elevation more particularly showing the mounting of the signal upon the vehicle, Fig. 3 is a detail front elevation of the device, Fig. 4 is a front elevation on an enlarged scale with the front closure of the device removed and showing the mounting of the signal lights within the casing employed, Fig. 5 is a vertical sectional view taken on the line 5—5 of Fig. 4 and looking in the direction of the arrows, Fig. 6 is a detail view showing the mounting of the switch employed, Fig. 7 is a diagrammatic view showing the wiring of the signal lights as well as the wiring of the tail lights, and Fig. 8 is a fragmentary vertical sectional view taken at right angles to Fig. 5 and showing the manner in which the door is locked in closed position.

In carrying out the invention we employ an oblong casing 10. This casing is open at its front side and is provided adjacent its lower extremity with a horizontal partition 11 dividing the casing into a signal compartment 12 and a tail light compartment 13. Connected to the rear wall of the casing is a socket member 14 equipped with a set screw 15. This socket is designed to receive the adjustable post 16 of a bracket 17 for supporting the device upon a vehicle and in Fig. 1 of the drawings we have shown the bracket attached to one rear fender of a conventional type of vehicle. As will be seen, the signal will thus be mounted in position where it may be readily observed by traffic approaching in the rear of the vehicle. The set screw 15 may, of course, be operated for adjustably positioning the casing longitudinally of the post 16 of the bracket while this post may be adjustably swung upon the bracket for positioning the signal at the desired angle with respect to the vehicle. The bracket 17 may be of any approved type and has only for convenience been conventionally shown. Connected to the rear wall of the casing adjacent opposite ends thereof are depending hangers 18 provided at their lower ends with suitable loops for receiving approved fastening devices connecting a license tag, as conventionally shown at 19, with the brackets. This tag will thus be supported in a conspicuous place beneath the casing. Formed through the bottom wall of the casing at its rear margin is a longitudinally extending window opening disposed directly above the license tag and closed by a transparent pane 20 secured within the tail light compartment 13 of the casing in any approved manner.

Removably fitted within the signal compartment 12 of the casing to extend transversely thereof are substantially frustopyramidal reflectors 21, 22 and 23 respectively. These reflectors may be formed of sheet metal or other approved material and, at their inner ends abut the rear wall of the casing while the outer ends of the said reflectors are disposed to abut each other and snugly fit between the partition 11 and the top wall of the casing. Upstanding from the said partition to project into these reflectors adjacent the inner ends thereof are approved light sockets 24, removably connected with the said partition. Mounted in the socket of the reflector 21 is an electric lamp 25 providing a right turn signal lamp. Mounted within the socket of the reflector 22 is an electric lamp 26 providing a stop signal lamp, it being observed in this connection that the reflector 22 is somewhat narrower at its outer end than are the reflectors 21 and 23. Mounted in the socket of the reflector 23 is an electric lamp 27 providing a left turn signal lamp. Detachably connected with the partition 11 to depend therefrom are spaced light sockets 28 of approved character and mounted within these sockets are tail lamps 29 projecting into the tail light compartment 13 of the casing above the pane 20 thereof. It will thus be seen that when these lamps are energized, the license tag 19 beneath the casing will be effectually illuminated. Formed on the front edges of the casing are inwardly directed flanges 30 and hinged upon the rear wall of the casing at one end thereof is a door 31. This door is adapted to be opened for receiving a front closure 32 for the casing slidably fitting beneath the flanges 30 thereof. At its inner side this front closure abuts, as particularly shown in Fig. 5, the front end edge of the partition 11 as well as the front end edges of the reflectors 21, 22 and 23, respectively, for tightly binding the said reflectors within the casing and is held against displacement by the door. The door is provided at its front edge with a flange 31ᵃ and at its top and bottom edges with flanges 31ᵇ these flanges being adapted to snugly fit within the adjacent end of the casing to provide a water tight joint between the door and casing. Loosely fitted through the top and bottom walls of the casing and threaded through the flanges 31ᵇ are screws 31ᶜ locking the door closed. As will be clear, access to the signal lamps may be easily had by opening this door and by displacing the lamp sockets the reflectors may be readily placed within or removed from the casing through the door opening. In like manner the front closure for the casing as well as the pane 20 may be similarly removed. The front closure is, as particularly shown in Fig. 5, formed of a metal or opaque panel 33 overlying the front end of the tail light compartment of the casing, and a transparent panel 34 overlying the signal compartment of the casing. This transparent panel is preferably formed of glass and, at its lower margin, is snugly received within a suitable channel 35 formed on the uper margin of the opaque panel 33 for rigidly connecting the said panels. Formed through the panel 33 centrally thereof is a preferably oval shaped tail light opening 36 closed by a preferably red colored glass pane 37 secured in any approved manner upon the inner side of the panel to overlie the said opening. Thus, when the tail lamps are energized a red colored light will be projected through the tail light opening of the casing.

Attention is now directed to the fact that since the front ends of the reflectors 21, 22 and 23 are arranged to abut the transparent panel 34 of the closure 32, these reflectors will coact with the said closure panel to divide the signal compartment 12 of the casing into a right turn signal chamber formed by the reflector 21, a stop signal chamber formed by the reflector 22, and a left turn signal chamber formed by the reflector 23, so that the said chambers may be selectively illuminated by means of the lamps 25, 26 and 27, respectively. Imprinted or otherwise imposed upon the said panel at the front end of the right turn signal chamber is a representation of a human hand pointing toward the right and providing a right turn signal 38. Imprinted or otherwise imposed upon the panel at the front end of the stop signal chamber are the vertically arranged letters of the word stop providing a stop signal 39, and imprinted or otherwise imposed upon the panel at the front end of the left turn signal chamber is the representation of a human hand pointing toward the left and providing a left turn signal 40. Preferably the portions of the panel 34 bearing the signals 38, 39 and 40, are uncolored or white while the remaining area of the said panel is tinted red to form a background for the signals so that the said signals will be readily readable. It will thus be seen that upon the energization of the right turn signal lamp 25, the right turn signal 38 will be illuminated for giving a signal of an intention of the driver to turn to the right. Upon the energization of the stop signal lamp 26, the stop signal 39 will be illuminated for giving a signal of the intention of the driver to stop. In like manner, upon the energization of the left turn signal lamp 27, the left turn signal 40 will be illuminated for giving a signal of an intention of the driver to turn to the left.

Controlling the different signal lamps as well as the tail lamps 29 is an approved switch 41 preferably connected in suitable manner, as shown in Fig. 6 of the drawings, to the steering post of the vehicle. Mounted upon the casing of this switch is a switch signal lamp 42 and projecting upwardly through the switch casing is a plurality of switch keys controlling switch members 43, 44 and 45 respectively. Such switches are of the double pole type and in Fig. 7 of the drawings we have diagrammatically illustrated the said switches as well as the wiring therefrom to the several lamps of the casing. Referring now more particularly to this figure, it will be seen that a wire 47 is led from one pole of the switch 43 to the signal lamp 27. A wire 48 is led from a corresponding terminal of the switch 44 to the signal lamp 26, while a wire 49 is led from a corresponding terminal of the switch 45 to the signal lamp 25. Leading from all of these lamps is a wire 50 branching from a wire 51 leading from one terminal of a battery or other suitable source of electrical energy upon the vehicle and connected to the socket of the signal lamp 42, from which socket the wire is then continued and connected to opposite corresponding terminals of the switches 43, 44, and 45, respectively. Leading from the other terminal of the battery is a wire 52 which is connected to corresponding intermediate terminals of the said switches. Leading from the wire 52 is a branch wire 53 connected to one terminal of the usual tail light switch upon the instrument board of the vehicle, such switch being diagrammatically shown at 46, and leading from the other terminal of this switch is a wire 54 connected with the lamps 29, which, in turn, are connected with the wire 50. Accordingly, when the key of the switch 43 is depressed to close this switch, current will then flow from the battery through the wire 51 and wire 50, through the lamp 27 and wire 47, and thence through the switch when the current will return to the battery through the wire 52. The lamp 27 will thus be energized for giving the left turn signal, as previously described. At the same time current will flow through the wire 51, lamp 42 and switch 43 to return to the battery through the wire 52. The lamp 42 upon the switch casing will therefore be simultaneously energized to give a signal at the switch that the switch has been operated or closed for giving the direction signal. In a similar manner, closing of the switch 44 will cause the energization of the lamp 26 to give a stop signal. Simultaneously, the signal lamp 42 upon the switch will be energized for giving a signal at the switch that such stop signal is being displayed. Also in like manner, closing of the switch 45 will cause the energization of the lamp 25 for giving a right turn signal. Simultaneously with the display of this signal, the lamp 42 upon the switch casing will be energized for giving a signal at the switch that the right turn direction signal is displayed. We, therefore, provide an arrangement whereby the different direction signals may be selectively controlled with ease from the driver's seat while a pilot or signal light will be energized at the switch coincident with the display of each signal. Since it will often be found necessary to display a tail light when it is not desired to display any direction signal, the tail lamps 29 are controlled from the switch 46 so that these tail lamps may be energized without energizing any of the direction signal lamps or energizing the signal lamp of the switch. Upon the closing of the switch 46 current will then flow from the battery through the wire 51 and branch wire 50 to continue through the lamps 29 and through the wire 54 to the switch. From the switch the current will then return through the wires 53 and 52 to the battery. Thus, it will be seen that the switch 46 may be closed to display a tail light when desired without interfering with the operation of the direction signals.

Having thus described the invention, what is claimed as new is:

A direction signal including a casing, a partition within the casing defining a signal compartment and a tail light compartment therein, one end wall of the casing being hinged to form a door for said compartments, a closure for said compartments slidably fitted within the casing and normally held against displacement by the door, a plurality of independent reflectors fitted within the signal compartment rested upon said partition and abutting each other as well as abutting the closure to define a plurality of separate signal chambers, lamp sockets upstanding from the partition to project into the reflectors and normally holding said reflectors against movement within the casing, a lamp carried by the respective sockets within the reflectors for illuminating each of said chambers, and means within the tail light compartment for illuminating such compartment.

In testimony whereof we affix our signatures.

RAY WILDE. [L. S.]
ERNEST R. WIMMERMARK. [L. S.]